United States Patent
Yanagihara

(10) Patent No.: US 12,028,017 B2
(45) Date of Patent: Jul. 2, 2024

(54) SOLAR POWER GENERATION APPARATUS

(71) Applicant: Eagle Sekkei, Co., Ltd., Fukui (JP)

(72) Inventor: Satoshi Yanagihara, Fukui (JP)

(73) Assignee: EAGLE SEKKEI, CO., LTD., Fukui (JP)

( * ) Notice: Subject to any disclaimer, the term of this patent is extended or adjusted under 35 U.S.C. 154(b) by 33 days.

(21) Appl. No.: 17/940,459

(22) Filed: Sep. 8, 2022

(65) Prior Publication Data

US 2023/0080045 A1    Mar. 16, 2023

(30) Foreign Application Priority Data

Sep. 10, 2021    (JP) .................................. 2021-147500

(51) Int. Cl.
*H02S 40/22*    (2014.01)

(52) U.S. Cl.
CPC ........... *H02S 40/22* (2014.12); *H02J 2300/22* (2020.01)

(58) Field of Classification Search
CPC . H01L 31/00–078136; Y02E 10/50–60; H02S 40/20–22
USPC .................................................. 136/243–265
See application file for complete search history.

(56) References Cited

U.S. PATENT DOCUMENTS

| | | |
|---|---|---|
| 2014/0182676 A1 | 7/2014 | Rosenberg et al. |
| 2019/0131921 A1 | 5/2019 | Bae |

FOREIGN PATENT DOCUMENTS

| | | |
|---|---|---|
| JP | 2002-094103 | 3/2002 |
| JP | 2004-214423 | 7/2004 |
| JP | 3180413 U * | 12/2012 |
| JP | 2013-204331 | 10/2013 |
| JP | 2014-095281 | 5/2014 |
| JP | 2014-527638 | 10/2014 |
| JP | 2015-211629 | 11/2015 |
| JP | 2020-520216 | 7/2020 |
| JP | 2021-019494 | 2/2021 |
| KR | 2010-0001204 | 1/2010 |
| KR | 1025929 B1 * | 3/2011 |

OTHER PUBLICATIONS

Notice of Reasons for Refusal issued Nov. 16, 2021 in corresponding Japanese Patent Application No. 2021-147500, with English translation.

\* cited by examiner

*Primary Examiner* — Bach T Dinh
(74) *Attorney, Agent, or Firm* — Wenderoth, Lind & Ponack, L.L.P.

(57) ABSTRACT

A reflection unit 31 to 34 has an outer reflection panel 311 to 314 and an inner reflection panel 321 to 324. The outer reflection panel 311 to 314 is disposed around power generation units 22 to 24. The inner reflection panel 321 to 324 is disposed substantively parallel to the outer reflection panel 311 to 314 between the outer reflection panel 311 to 314 and the power generation units 22 to 24. The reflection units 31 to 34 reflects solar light injected into gaps 361 to 364 between the outer reflection panels 311 to 314 and the inner reflection panels 321 to 324 to transmit the solar light into the power generation units 22 to 24.

4 Claims, 3 Drawing Sheets

SOLAR POWER GENERATION APPARATUS

The present application claims the benefit of priority to Japanese patent application No. 2021-147500, filed on 10 Sep. 2021.

TECHNICAL FIELD

The present invention relates to a solar power generation apparatus.

BACKGROUND ART

JP2004-214423A discloses a solar power generation system, in which a condensing device condenses solar light, which is transmitted via optical fiber cables to photoelectric units.

JP2021-019494A discloses a solar power generation apparatus, in which side walls and floors are covered with a reflective material to irradiate solar light to piled solar panels.

SUMMARY OF INVENTION

Technical Problem

The solar power generation system disclosed in JP2004-214423A requires to install the condensing device in addition to the photoelectric unit. Therefore, it cannot reduce installation area. Also, it requires a large number of optical fiber cables. Thus, the installation cost becomes higher.

In the solar power generation apparatus disclosed in JP2021-019494A, amounts of solar light irradiated to the solar panels are different from one another. Thus, electric power generation efficiency becomes lower.

The present invention aims to solve these problems, for example.

Solution to Problem

A solar power generation apparatus includes:
at least two power generation units for receiving solar light to generate electric power; and
at least one reflection unit for reflecting solar light to transmit the solar light into the power generation units.
Each of the power generation units includes:
a first solar power generation panel having a flat plate shape and a receiving face oriented to a first direction for receiving solar light to generate electric power;
a second solar power generation panel having a flat plate shape, disposed substantively parallel to, and in the first direction with respect to, the first solar power generation panel, and having a receiving face oriented to a second direction opposite the first direction for receiving solar light to generate electric power; and
a power generation reflection unit disposed between the first solar power generation panel and the second solar power generation panel, and for reflecting solar light injected from a side in a direction substantively perpendicular to the first direction and the second direction to irradiate the solar light onto the receiving faces of the first solar power generation panel and the second solar power generation panel.
The power generation units are arranged to be piled in the first direction and the second direction.

The reflection unit has:
an outer reflection panel having a flat plate shape and disposed parallel to the first direction and the second direction around the power generation units; and
an inner reflection panel having a flat plate shape and disposed parallel to the outer reflection panel between the outer reflection panel and the power generation units.

The reflection unit reflects solar light injected from a side in the second direction into a gap between the outer reflection panel and the inner reflection panel to transmit the solar light to the power generation reflection unit.

The inner reflection panel may have at least two light passing holes permitting solar light to pass through the light passing holes, and located at positions where the solar light passing through the light passing holes is transmitted to the power generation reflection units.

A total aperture area of at least one of the light passing holes located at a position corresponding to one located in the second direction of the power generation units may be smaller than that of at least one of the light passing holes located at a position corresponding to one located in the first direction of the power generation units.

The inner reflection panel may include a plurality of conical parts, each having a truncated conical side face shape with an inner surface facing the outer reflection panel and reflecting solar light.

The light passing holes may be provided through the conical parts.

The outer reflection panel may include a plurality of conical parts, each having a truncated conical side face shape with an inner surface facing the inner reflection panel and reflecting solar light.

The conical parts of the outer reflection panel may be located at positions different from those directly opposite the conical parts of the inner reflection panel.

A solar power generation apparatus includes at least one power generation unit for receiving solar light to generate electric power.

The power generation unit includes:
a first solar power generation panel having a flat plate shape and a receiving face oriented to a first direction for receiving solar light to generate electric power;
a second solar power generation panel having a flat plate shape, disposed substantively parallel to, and in the first direction with respect to, the first solar power generation panel, and having a receiving face oriented to a second direction opposite the first direction for receiving solar light to generate electric power; and
a power generation reflection unit disposed between the first solar power generation panel and the second solar power generation panel, and for reflecting solar light injected from a side in a direction substantively perpendicular to the first direction and the second direction to irradiate the solar light onto the receiving faces of the first solar power generation panel and the second solar power generation panel.

The power generation reflection unit has:
an intermediate reflection panel having a flat plate shape and disposed substantively parallel to the first solar power generation panel;
a first reflection panel having a flat plate shape and disposed substantively parallel to the intermediate reflection panel between the intermediate reflection panel and the first solar power generation panel; and
a second reflection panel having a flat plate shape and disposed substantively parallel to the intermediate reflection panel between the intermediate reflection panel and the second solar power generation panel.

The first reflection panel has at least two light passing holes permitting solar light to pass through the light passing holes, and located at positions where the solar light passing through the light passing holes is irradiated to the first solar power generation panel.

The second reflection panel has at least two light passing holes permitting solar light to pass through the light passing holes, and located at positions where the solar light passing through the light passing holes is irradiated to the second solar power generation panel.

A total aperture area of at least one of the light passing holes located at a position near by an entrance for injecting solar light into the power generation reflection unit is smaller than that of at least one of the light passing holes located at a position far from the entrance for injecting solar light into the power generation reflection unit.

The first reflection panel may include a plurality of conical parts, each having a truncated conical side face shape with an inner surface facing the intermediate reflection panel and reflecting solar light.

The light passing holes may be provided through the conical parts.

The intermediate reflection panel may include a plurality of conical parts, each having a truncated conical side face shape with an inner surface facing the first reflection panel and reflecting solar light.

The conical parts of the intermediate reflection panel may be located at positions different from those directly opposite the conical parts of the first reflection panel.

The second reflection panel may include a plurality of conical parts, each having a truncated conical side face shape with an inner surface facing the intermediate reflection panel and reflecting solar light.

The light passing holes may be provided through the conical parts.

The intermediate reflection panel may include a plurality of conical parts, each having a truncated conical side face shape with an inner surface facing the second reflection panel and reflecting solar light.

The conical parts of the intermediate reflection panel may be located at positions different from those directly opposite the conical parts of the second reflection panel.

Advantageous Effects of the Invention

The reflection unit transmitting solar light to the power generation units using the outer reflection panel and the inner reflection panel enables to evenly distribute solar light to the power generation units, without using optical fiber cables or so.

The amount of solar light irradiated into the solar power generation panels being adjusted by the total aperture areas of the light passing holes enables to evenly distribute solar light to the solar power generation panels and/or whole of the solar power generation panel.

DESCRIPTION OF EMBODIMENT

Figure 1:
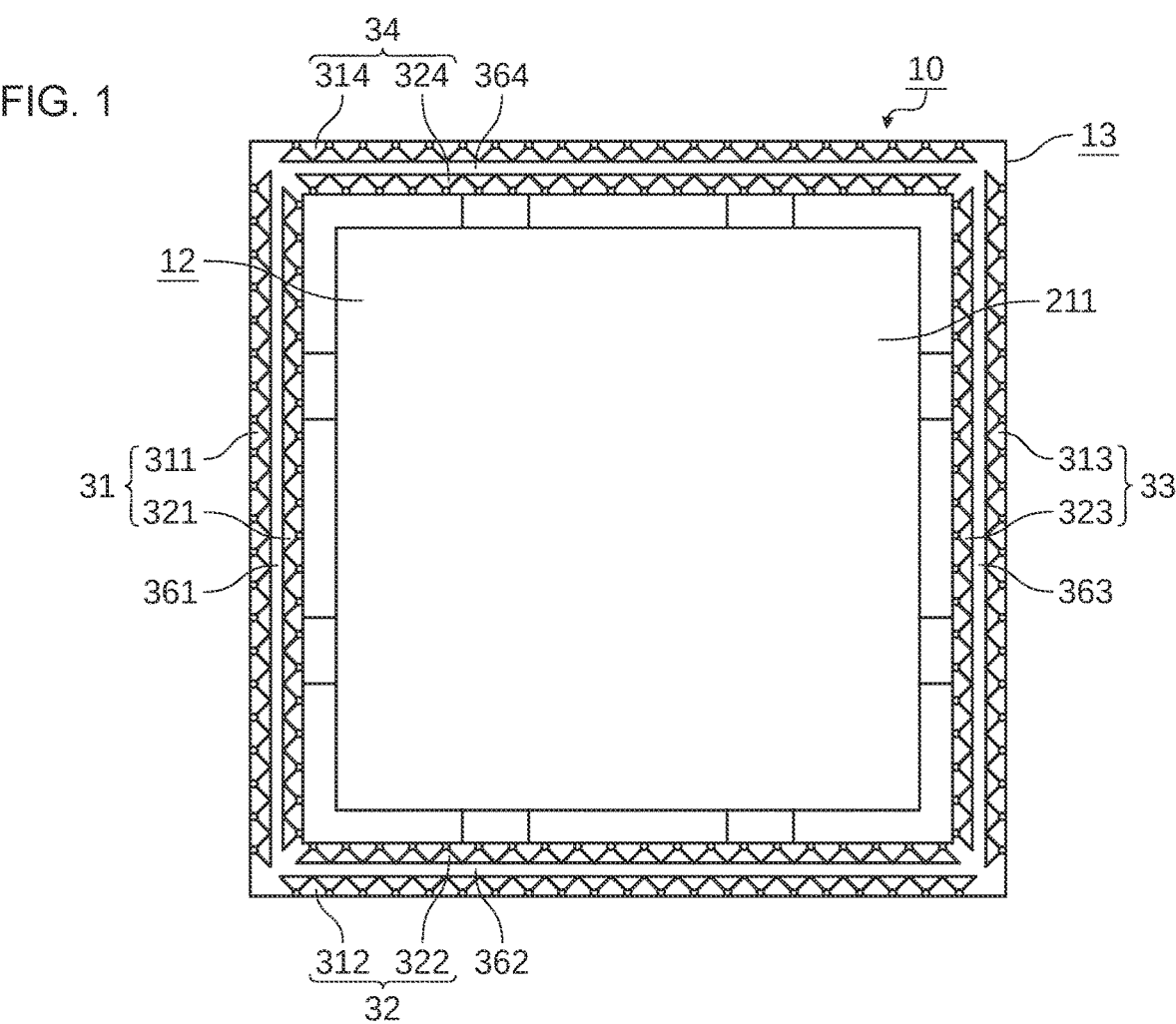
FIG. 1 shows a plan view of an example of a solar power generation apparatus.
Figure 2:
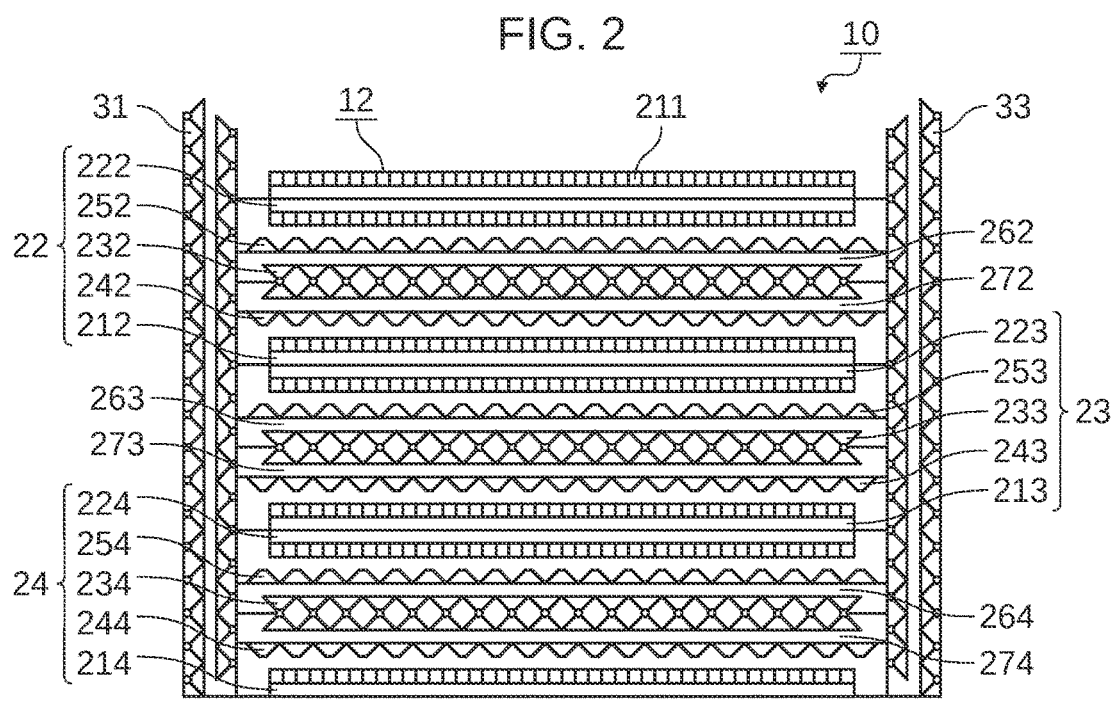
FIG. 2 shows a sectional side view of the solar power generation apparatus.

Referring to FIGS. 1 and 2, an example of a solar power generation apparatus 10 will be described.

The solar power generation apparatus 10 has, for example, a power generation section 12 and a reflection section 13.

The power generation section 12 has, for example, a solar power generation panel 211 and three power generation units 22 to 24.

The power generation unit 22 has two solar power generation panels 212 and 222, and a power generation reflection unit having three reflection panels 232, 242 and 252.

The power generation unit 23 has two solar power generation panels 213 and 223, and a power generation reflection unit having three reflection panels 233, 243 and 253.

The power generation unit 24 has two solar power generation panels 214 and 224, and a power generation reflection unit having three reflection panels 234, 244 and 254.

Each of the solar power generation panels 211 to 214 and 222 to 224 has a generally rectangular and flat plate shape, and is generally horizontally disposed.

Each of the solar power generation panels 211 to 214, which is an example of a second solar power generation panel, is disposed upward. That is, its receiving face for receiving solar light to generate electric power is oriented to a downward direction, which is an example of a second direction.

Each of the solar power generation panels 222 to 224, which is an example of a first solar power generation panel, is disposed downward. That is, its receiving face for receiving solar light to generate electric power is oriented to an upward direction, which is an example of a first direction.

Each of the reflection panels 232 to 234, 242 to 244 and 252 to 254 has a generally rectangular and flat plate shape, and is generally horizontally disposed.

That is, the solar power generation panels 211 to 214 and 222 to 224, and the reflection panels 232 to 234, 242 to 244 and 252 to 254 are arranged parallel to one another.

The solar power generation panel 212 is disposed below the solar power generation panel 222, apart from, and face to face with, the solar power generation panel 222.

The reflection panel 232 is disposed between the solar power generation panel 212 and the solar power generation panel 222, and apart from the solar power generation panel 212 and the solar power generation panel 222.

The reflection panel 242 is disposed between the reflection panel 232 and the solar power generation panel 212, and apart from the reflection panel 232 and the solar power generation panel 212. A gap 272 is formed between the reflection panel 232 and the reflection panel 242.

The reflection panel 252 is disposed between the reflection panel 232 and the solar power generation panel 222, and apart from the reflection panel 232 and the solar power generation panel 222. A gap 262 is formed between the reflection panel 232 and the reflection panel 252.

The solar power generation panel 213 is disposed below the solar power generation panel 223, apart from, and face to face with, the solar power generation panel 223.

The reflection panel 233 is disposed between the solar power generation panel 213 and the solar power generation panel 223, and apart from the solar power generation panel 213 and the solar power generation panel 223.

The reflection panel 243 is disposed between the reflection panel 233 and the solar power generation panel 213, and apart from the reflection panel 233 and the solar power generation panel 213. A gap 273 is formed between the reflection panel 233 and the reflection panel 243.

The reflection panel 253 is disposed between the reflection panel 233 and the solar power generation panel 223, and apart from the reflection panel 233 and the solar power generation panel 223. A gap 263 is formed between the reflection panel 233 and the reflection panel 253.

The solar power generation panel 214 is disposed below the solar power generation panel 224, apart from, and face to face with, the solar power generation panel 224.

The reflection panel 234 is disposed between the solar power generation panel 214 and the solar power generation panel 224, and apart from the solar power generation panel 214 and the solar power generation panel 224.

The reflection panel 244 is disposed between the reflection panel 234 and the solar power generation panel 214, and apart from the reflection panel 234 and the solar power generation panel 214. A gap 274 is formed between the reflection panel 234 and the reflection panel 244.

The reflection panel 254 is disposed between the reflection panel 234 and the solar power generation panel 224, and apart from the reflection panel 234 and the solar power generation panel 224. A gap 264 is formed between the reflection panel 234 and the reflection panel 254.

The power generation unit 22 is disposed adjacently under the solar power generation panel 211. The solar power generation panel 222 is disposed back to back with the solar power generation panel 211.

The power generation unit 23 is disposed adjacently under the power generation unit 22. The solar power generation panel 223 is disposed back to back with the solar power generation panel 212.

The power generation unit 24 is disposed adjacently under the power generation unit 23. The solar power generation panel 224 is disposed back to back with the solar power generation panel 213.

In this manner, the power generation units 22 to 24 are arranged to be substantively vertically piled.

The reflection section 13 has a generally rectangular cylindrical shape, and is disposed to surround around the power generation section 12.

The reflection section 13 has, for example, four reflection units 31 to 34.

The reflection unit 31 is disposed at a left side of the power generation section 12, and has two reflection panels 311 and 321.

The reflection unit 32 is disposed at a front side of the power generation section 12, and has two reflection panels 312 and 322.

The reflection unit 33 is disposed at a right side of the power generation section 12, and has two reflection panels 313 and 323.

The reflection unit 34 is disposed at a rear side of the power generation section 12, and has two reflection panels 314 and 324.

Each of the reflection panels 311 to 314 and 321 to 324 has a generally rectangular and flat plate shape, and is substantively vertically disposed.

The reflection panels 311 to 314 are disposed apart from the power generation section 12.

The reflection panel 321 is disposed between the power generation section 12 and the reflection panel 311, parallel to, and apart from, the reflection panel 311. A gap 361 is formed between the reflection panel 311 and the reflection panel 321.

The reflection panel 322 is disposed between the power generation section 12 and the reflection panel 312, parallel to, and apart from, the reflection panel 312. A gap 362 is formed between the reflection panel 312 and the reflection panel 322.

The reflection panel 323 is disposed between the power generation section 12 and the reflection panel 313, parallel to, and apart from, the reflection panel 313. A gap 363 is formed between the reflection panel 313 and the reflection panel 323.

The reflection panel 324 is disposed between the power generation section 12 and the reflection panel 314, parallel to, and apart from, the reflection panel 314. A gap 364 is formed between the reflection panel 314 and the reflection panel 324.

Figure 3:
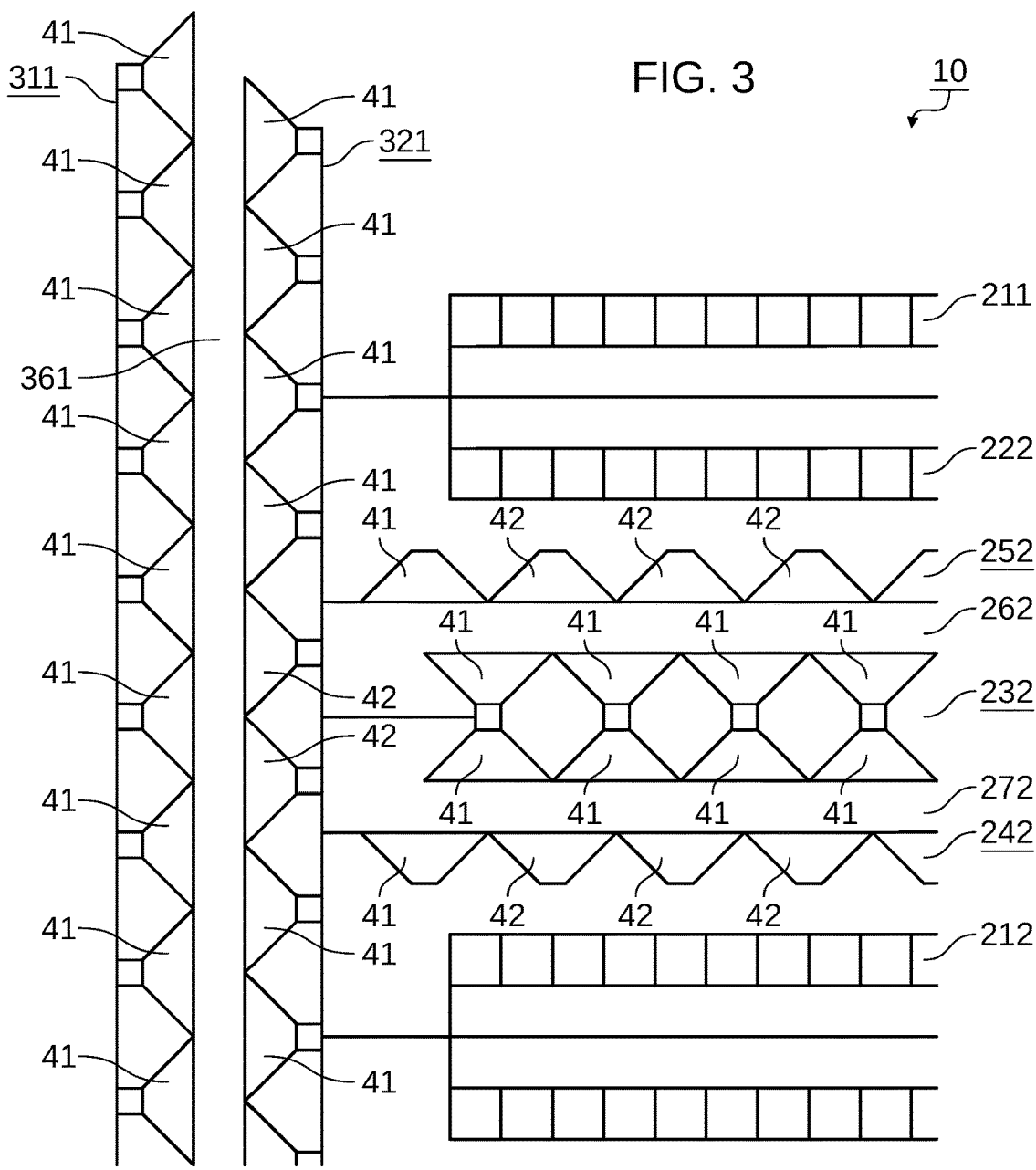
FIG. 3 shows a partially enlarged sectional side view of the solar power generation apparatus.
Figure 4:
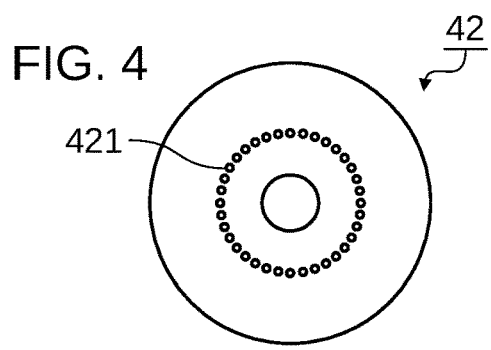
FIG. 4 shows a partially enlarged view of an example of a conical part.

Referring to FIGS. 3 and 4, the reflection panels will be described.

Each of the reflection panels 311 to 314, which is an example of an outer reflection panel, is provided on its inner side with a number of conical parts 41 leaving no spaces.

Each of the reflection panels 321 to 324, which is an example of an inner reflection panel, is provided on its outer side with a number of conical parts 41 and 42 leaving no spaces.

The conical parts 41 and 42 of the reflection panels 321 to 324 are arranged not directly opposite the conical parts 41 of the reflection panels 311 to 314 disposed opposite the reflection panels 321 to 324, but at positions shifted from them.

The conical parts 42 are provided at positions corresponding to the gaps between the reflection panels 242 to 244 and the reflection panels 252 to 254 of the power generation units 22 to 24, which are located next to the reflection panels 321 to 324. Thereby, solar light passing through light passing holes 421, which will be described below, is transmitted to the power generation reflection units of the power generation units 22 to 24.

At the other positions, the conical parts 41 are provided.

Each of the reflection panels 232 to 234, which is an example of an intermediate reflection panel, is provided on its upper and lower sides with a number of conical parts 41 leaving no spaces.

Each of the reflection panels 242 to 244, which is an example of a second reflection panel, is provided on its upper side with a number of conical parts 41 and 42 leaving no spaces.

The conical parts 41 and 42 of the reflection panels 242 to 244 are arranged not directly opposite the conical parts 41 of the reflection panels 232 to 234 disposed opposite the reflection panels 242 to 244, but at positions shifted from them.

The conical parts 42 are provided at positions corresponding to the solar power generation panels 212 to 214, which are located below the reflection panels 242 to 244. Thereby, solar light passing through the light passing holes 421 is irradiated to the receiving faces of the solar power generation panels 212 to 214.

At the other positions, the conical parts 41 are provided.

Each of the reflection panels 252 to 254, which is an example of an first reflection panel, is provided on its lower side with a number of conical parts 41 and 42 leaving no spaces.

The conical parts 41 and 42 of the reflection panels 252 to 254 are arranged not directly opposite the conical parts 41 of the reflection panels 232 to 234 disposed opposite the reflection panels 252 to 254, but at positions shifted from them.

The conical parts 42 are provided at positions corresponding to the solar power generation panels 222 to 224, which are located above the reflection panels 252 to 254. Thereby, solar light passing through the light passing holes 421 is irradiated to the receiving faces of the solar power generation panels 222 to 224.

At the other positions, the conical parts 41 are provided.

Each of the conical parts 41 and 42 is a plate having a generally truncated conical side face shape, and reflects solar light on its inner surface. This makes to reflect solar light injected in the conical parts 41 and 42 toward various directions.

The inner surfaces of the conical parts 41 provided on the reflection panels 311 to 314 faces the reflection panels 321 to 324. The inner surfaces of the conical parts 41 and 42 provided on the reflection panels 321 to 324 faces the reflection panels 311 to 314. Thereby, solar light injected into the gaps 361 to 364 between the reflection panels 311 to 314 and the reflection panels 321 to 324 repeats reflection in the gaps 361 to 364.

The inner surfaces of the conical parts 41 provided on the lower side of the reflection panels 232 to 234 faces the reflection panels 242 to 244. The inner surfaces of the conical parts 41 and 42 provided on the reflection panels 242 to 244 faces the reflection panels 232 to 234. Thereby, solar light injected into the gaps 272 to 274 between the reflection panels 232 to 234 and the reflection panels 242 to 244 repeats reflection in the gaps 272 to 274.

The inner surfaces of the conical parts 41 provided on the upper side of the reflection panels 232 to 234 faces the reflection panels 252 to 254. The inner surfaces of the conical parts 41 and 42 provided on the reflection panels 252 to 254 faces the reflection panels 232 to 234. Thereby, solar light injected into the gaps 262 to 264 between the reflection panels 232 to 234 and the reflection panels 252 to 254 repeats reflection in the gaps 262 to 264.

Each of the conical parts 42 is provided with a number of light passing holes 421. The light passing holes 421 penetrates through the conical parts 42 from their inner surface to their outer surface. This enables part of the solar light injected in the conical parts 42 to passing through the light passing holes 421 to reach back sides of the conical parts 42.

The number and arrangement of the light passing holes 421 provided in the conical parts 42 depend on the position of the conical parts 42. For example, the conical parts 42 provided at higher positions on the reflection panels 321 to 324 have a smaller number of the light passing holes 421, and those provided at lower positions have a larger number of the light passing holes 421. Also, the conical parts 42 provided at nearer positions by peripheries of the power generation reflection units, which are entrances for injecting solar light into the power generation reflection units, on the reflection panels 242 to 244 and 252 to 254 have a smaller number of the light passing holes 421, and those provided at nearer positions by the centers of the power generation reflection units have a larger number of the light passing holes 421.

Figure 5:
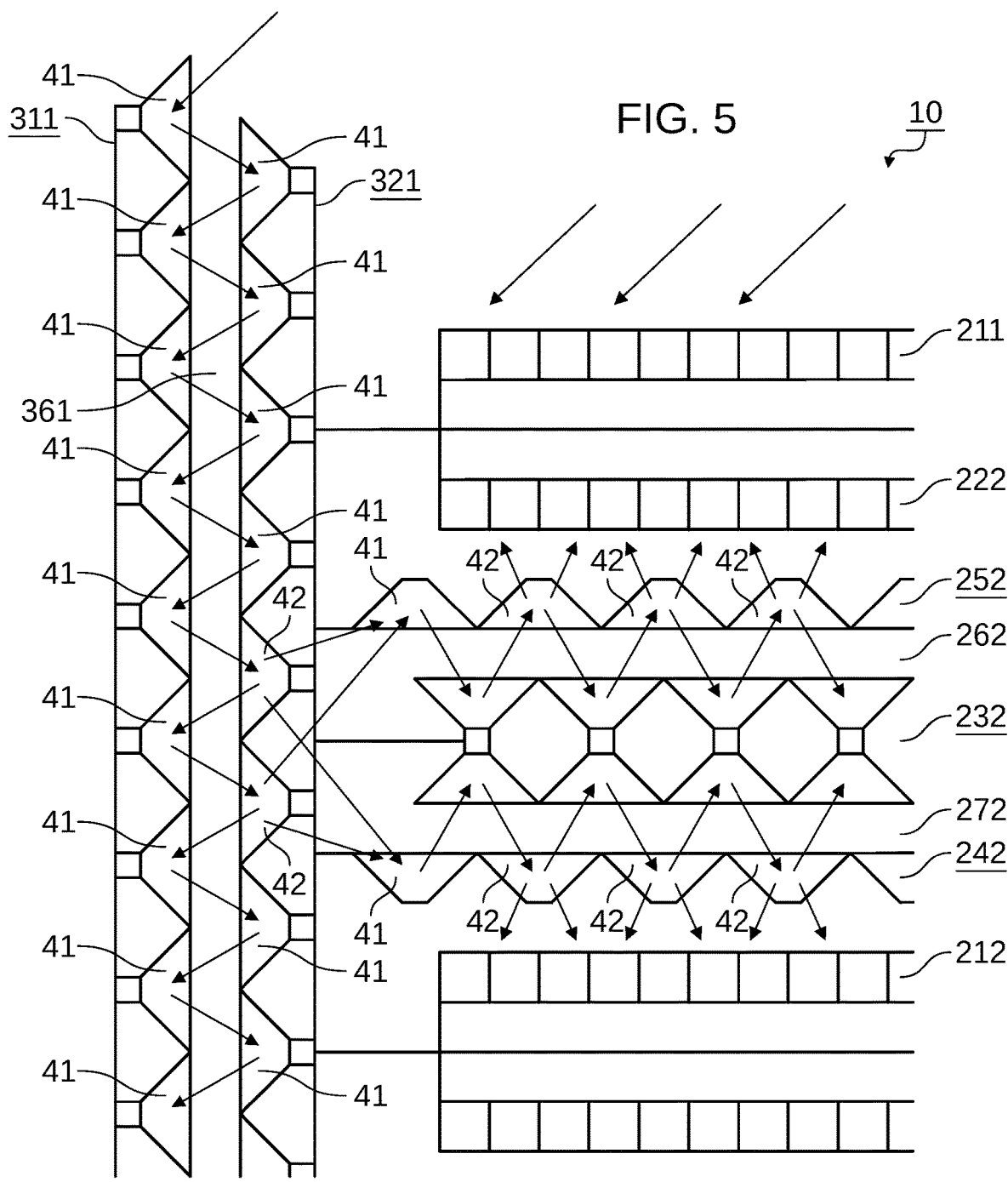
FIG. 5 shows an example of operation of the solar power generation apparatus.

Referring to FIG. 5, operation of the solar power generation apparatus will be described.

The solar power generation apparatus 10 is installed at a place where it can receive solar light, such as outdoors.

Solar light injected from upside on the solar power generation panel 211, which is at the uppermost position, is directly utilized for generation of electric power.

Solar light injected into the gaps 361 to 364 between the reflection panels 311 to 314 and the reflection panels 321 to 324 repeats reflection toward various directions on the conical parts 41 and 42 of the reflection panels 311 to 314 and 321 to 324, and finally passes through the light passing holes 421 to back sides of the reflection panels 321 to 324 and to be injected into the gaps 262 to 264 and 272 to 274 of the power generation units 22 to 24 from their transverse sides.

The solar light injected into the gaps 262 to 264 between the reflection panels 232 to 234 and the reflection panels 252 to 254 repeats reflection toward various directions on the conical parts 41 and 42 of the reflection panels 232 to 234 and 252 to 254, and finally passes through the light passing holes 421 to back sides of the reflection panels 252 to 254 and to be irradiated on the solar power generation panels 222 to 224 to be utilized for generation of electric power.

The solar light injected into the gaps 272 to 274 between the reflection panels 232 to 234 and the reflection panels 242 to 244 repeats reflection toward various directions on the conical parts 41 and 42 of the reflection panels 232 to 234 and 242 to 244, and finally passes through the light passing holes 421 to back sides of the reflection panels 242 to 244 and to be irradiated on the solar power generation panels 212 to 214 to be utilized for generation of electric power.

The power generation section 12 occupies only an area for one solar power generation panel. Thus, the solar power generation apparatus 10 can be installed in a very small space. However, the power generation section 12 has seven solar power generation panels 211 to 214 and 222 to 224. Thus, it can generate electric power seven times as much. This enables to increase the amount of generated electric power per area.

It should be noted that the number of the power generation units may be larger or smaller. A larger number of the power generation units can make the amount of generated electric power per area larger.

The solar light injected from upward into the gaps 361 to 364 between the reflection panels 311 to 314 and the reflection panels 321 to 324 is divided into solar light passing through the light passing holes 421 of the conical parts 42 provided on the reflection panels 321 to 324 toward the power generation units 22 to 24 and solar light reflected on the conical parts 41 and 42. As the reflection toward various directions is repeated, the solar light reflected on the conical parts 41 and 42 gradually advances downward in the gaps 361 to 364. So, the solar light advancing downward in the gaps 361 to 364 becomes weaker as it goes lower.

In contrast, the numbers of the light passing holes 421 of the conical parts 42 provided on the reflection panels 321 to 324 are larger as they are provided at lower positions. Thus, the proportion of the solar light going toward the power generation units 22 to 24 becomes larger as it goes lower.

This enables to distribute approximately the same amounts of solar light to the power generation units 22 to 24. So, the electric power generation efficiency can be improved.

The solar light injected into the power generation units 22 to 24 from the reflection units 31 to 34 is divided into solar light passing through the light passing holes 421 of the conical parts 42 provided on the reflection panels 242 to 244 and 252 to 254 toward the solar power generation panels 212 to 214 and 222 to 224 and solar light reflected on the conical parts 41 and 42. As the reflection toward various directions is repeated, the solar light reflected on the conical parts 41 and 42 gradually advances toward the centers in the gaps 262 to 264 and 272 to 274. So, the solar light advancing toward the centers in the gaps 262 to 264 and 272 to 274 becomes weaker as it goes nearer by the centers.

In contrast, the numbers of the light passing holes 421 of the conical parts 42 provided on the reflection panels 242 to 244 and 252 to 254 are larger as they are provided at nearer positions by the centers. Thus, the proportion of the solar light going toward the solar power generation panels 212 to 214 and 222 to 224 becomes larger as it goes nearer by the centers.

This enables to distribute approximately the same amounts of solar light to every area on the solar power generation panels 212 to 214 and 222 to 224. So, the electric power generation efficiency can be improved.

it should be noted that the reflection section 13 may surround incompletely around the power generation section 12. For example, one or more of the reflection units 31 to 34 may be omitted. In this case, solar light advancing in the gap 262 to 264 and 272 to 274 becomes weaker at a position near by the peripheries of the power generation reflection units in a side with no reflection unit provided, because the position is far from an entrance for injecting solar light into the power generation reflection units.

Thus, the numbers of the light passing holes 421 should be determined based on whether the conical part 42 is far or not from the entrance for injecting solar light into the power generation reflection units, but not on whether it is near or not by the centers of the power generation reflection units.

Also, it should be noted that the sizes of the light passing holes 421 may be varied instead of, or in addition to, varying the number of them. For example, the conical parts 42 provided at higher positions on the reflection panels 321 to 324 have the light passing holes 421 with smaller sizes, and those provided at lower positions have the light passing holes 421 with larger sizes. Also, the conical parts 42 provided at farther positions from the entrances on the reflection panel 242 to 244 and 252 to 254 have the light passing holes 421 with larger size, and those provided at nearer positions by the entrances have the light passing holes 421 with smaller sizes.

Configuration in this manner can realize the same effect as the configuration in which the numbers of light passing holes 421 are varied.

That is, by varying total aperture areas of the light passing holes 421 provided in the conical parts 42 depending on the position of the conical parts 42, approximately the same amount of solar light can be distributed to all areas of the solar power generation panels 212 to 214 and 222 to 224 to improve electric power generation efficiency.

It should be noted that the solar power generation apparatus 10 may be installed to be obliquely slanted to be oriented to the sun. This enables to further improve electric power generation efficiency.

It should be noted also that the solar power generation apparatus 10 may be installed to fall sideways. That is, the solar power generation panels 211 to 214 and 222 to 224 may be disposed generally vertically. In this case, the reflection section 13 may be omitted, and thereby solar light may be injected directly into the gaps 262 to 264 and 272 to 274. Also, the uppermost solar power generation panel 211 may be omitted, because its electric power generation efficiency becomes lower.

The above-described embodiment is an example to facilitate to understand the present invention. The present invention is not limited to this, and includes those that have been variously modified, altered, added or removed without departing from the scope defined by the appended claims. This can be easily understood by those skilled in the art from the above description.

REFERENCE SIGNS LIST

10: solar power generation apparatus; 12: power generation section; 211 to 214, 222 to 224: solar power generation panel; 22 to 24: power generation unit; 232 to 234, 242 to 244, 252 to 254, 311 to 314, 321 to 324: reflection panels; 262 to 264, 272 to 274, 361 to 364: gap; 13: reflection section; 31 to 34: reflection unit; 41, 42: conical part; and, 421: light passing hole.

The invention claimed is:

1. A solar power generation apparatus comprising:
at least two power generation units for receiving solar light to generate electric power; and
at least one reflection unit for reflecting solar light to transmit the solar light into the power generation units,
wherein each of the power generation units includes:
a first solar power generation panel having a flat plate shape and a receiving face oriented to a first direction for receiving solar light to generate electric power;
a second solar power generation panel having a flat plate shape, disposed substantively parallel to, and in the first direction with respect to, the first solar power generation panel, and having a receiving face oriented to a second direction opposite the first direction for receiving solar light to generate electric power; and
a power generation reflection unit disposed between the first solar power generation panel and the second solar power generation panel, and for reflecting solar light injected from a side in a direction substantively perpendicular to the first direction and the second direction to irradiate the solar light onto the receiving faces of the first solar power generation panel and the second solar power generation panel,
wherein the power generation units are arranged to be piled in the first direction and the second direction,
wherein the reflection unit has:
an outer reflection panel having a flat plate shape and disposed parallel to the first direction and the second direction around the power generation units; and
an inner reflection panel having a flat plate shape and disposed parallel to the outer reflection panel between the outer reflection panel and the power generation units, and
wherein the reflection unit reflects solar light injected from a side in the second direction into a gap between the outer reflection panel and the inner reflection panel to transmit the solar light to the power generation reflection unit.

2. The solar power generation apparatus of claim 1,
wherein the inner reflection panel has at least two light passing holes permitting solar light to pass through the light passing holes, and located at positions where the solar light passing through the light passing holes is transmitted to the power generation reflection units, and
wherein a total aperture area of at least one of the light passing holes located at a position corresponding to one located in the second direction of the power generation units is smaller than that of at least one of the light passing holes located at a position corresponding to one located in the first direction of the power generation units.

3. The solar power generation apparatus of claim 2,
wherein the inner reflection panel includes a plurality of conical parts, each having a truncated conical side face shape with an inner surface facing the outer reflection panel and reflecting solar light, and
wherein the light passing holes are provided through the conical parts.

4. The solar power generation apparatus of claim 3,
wherein the outer reflection panel includes a plurality of conical parts, each having a truncated conical side face shape with an inner surface facing the inner reflection panel and reflecting solar light, and
wherein the conical parts of the outer reflection panel are located at positions different from those directly opposite the conical parts of the inner reflection panel.

* * * * *